(12) United States Patent
Johnson et al.

(10) Patent No.: US 11,268,551 B2
(45) Date of Patent: Mar. 8, 2022

(54) CLAMPS HAVING ROTATABLE CLAMPING ELEMENTS

(71) Applicant: Hewlett-Packard Development Company, L.P., Spring, TX (US)

(72) Inventors: Bruce G Johnson, Vancover, WA (US); Lonny Morgan, Vancouver, WA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/049,129

(22) PCT Filed: Jun. 19, 2018

(86) PCT No.: PCT/US2018/038226
§ 371 (c)(1),
(2) Date: Oct. 20, 2020

(87) PCT Pub. No.: WO2019/245531
PCT Pub. Date: Dec. 26, 2019

(65) Prior Publication Data
US 2021/0246921 A1  Aug. 12, 2021

(51) Int. Cl.
*F16B 2/10*  (2006.01)
*B41J 29/13*  (2006.01)

(52) U.S. Cl.
CPC ............... *F16B 2/10* (2013.01); *B41J 29/13* (2013.01)

(58) Field of Classification Search
CPC ............. E05B 15/008; Y10T 292/0817; Y10T 292/0818; Y10T 292/088; Y10T 292/0883; Y10T 292/0814; F16G 2/10
See application file for complete search history.

(56) References Cited

U.S. PATENT DOCUMENTS

| 322,513 | A | * | 7/1885 | Willaimson | .......... E05C 19/026 292/18 |
| 573,891 | A | * | 12/1896 | Martin | .................. A47L 13/512 248/113 |
| 3,311,188 | A | * | 3/1967 | Gutshall | ............... B60R 22/321 180/270 |
| 4,361,939 | A | * | 12/1982 | Gelula | ............... A44B 11/2515 24/631 |
| 4,570,310 | A | * | 2/1986 | Gelula | ..................... B63H 9/10 24/631 |
| 4,803,760 | A | * | 2/1989 | Gelula | ..................... B63H 9/10 24/631 |
| 5,921,422 | A | | 7/1999 | Hunter | |
| 5,997,056 | A | * | 12/1999 | Yamagishi | ............ E05C 19/022 292/341.17 |

FOREIGN PATENT DOCUMENTS

| CN | 1598224 A | 3/2005 |
| CN | 203726367 | 7/2014 |

(Continued)

*Primary Examiner* — Robert Sandy
(74) *Attorney, Agent, or Firm* — Brooks Cameron & Huebsch PLLP (57) ABSTRACT

An example damp can include a first post, a first clamping element rotatably oupled to the first post, a second post separate from the first post, a second clamping lement rotatably coupled to the second post, and a biasing device that couples the first lamping element to the second damping element.

15 Claims, 11 Drawing Sheets

(56) References Cited

FOREIGN PATENT DOCUMENTS

| | | |
|---|---:|---:|
| CN | 103273450 | 12/2014 |
| DE | 3830585 | 3/1990 |
| DE | 102008016902 | 11/2009 |
| GB | 2412405 B | 11/2006 |
| KR | 101386989 | 4/2014 |
| RU | 5574 A1 | 6/1928 |
| RU | 153848 A2 | 7/1963 |

* cited by examiner

CLAMPS HAVING ROTATABLE CLAMPING ELEMENTS

BACKGROUND

Apparatus, such as imaging systems (e.g., copiers, printers, and the like), can have doors, drawers, panels, and the like for accessing the interior of the apparatus, such as for maintenance, repairs, etc. For example, panels and/or doors can provide access to an interior of an imaging system for clearing print media (e.g., paper, plastic, etc.) jams. Some apparatus can include replaceable units, such as field replaceable units (FRUs), that can include a number of components, such as servomechanisms, motors, etc. For example, such a unit can be removed from an apparatus and replaced by another unit.

DETAILED DESCRIPTION

Clamps and apparatus, such as imaging systems, that may employ the clamps are described herein. The clamps can clamp pins during alignment processes. A clamp can initially have a large opening relative to the size (e.g., diameter) of the pin. The relatively large opening can help to reduce the likelihood of jamming (e.g., binding) from occurring between the pin and the clamp. The relatively large opening can provide a large region for receiving the pin, which can be helpful when trying to align the pin with the opening, such as when the opening and the pin are blocked from view.

As used herein, alignment processes include processes that can act to place objects into desired positions or at desired locations. As used herein, a clamp includes a device that can restrain an object from moving. As used herein, a pin includes an element that can be received in an opening to align an object and/or to secure the object.

In some examples, a clamp can have a pair of rotatable clamping elements, such as jaws, that can rotate about respective posts. A biasing device, such as a spring, can couple one of the clamping elements to the other clamping element. The biasing device can bias the clamping elements in a non-clamping relationship so that there is a large opening, relative to the diameter of the pin to be clamped between the clamping elements, that can help reduce jamming between the pin and the clamping elements and that can provide a large region, relative to the diameter of the pin, for receiving the pin.

As used herein, rotatable includes the ability to rotate. As used herein, a clamping element includes an element of a clamp that acts to restrain an object from moving. For example, as used herein, a rotatable clamping element includes an element of a clamp that acts to restrain an object and that has the ability to rotate. As used herein, a post includes a secured object about which another object can rotate.

The pin can be part of an object, such as a component of the apparatus. For example, the object can be an access panel, an access door, an access drawer, or a replaceable unit of an imaging device. In some examples, the object can rotate the clamping elements into direct contact with the pin as the object is moving. For example, as the clamping elements rotate, the clamping elements move closer to the pin until the clamping elements come into direct contact with the pin to clamp the pin. In some examples, one, or both, of the clamping elements can move the pin while rotating. For example, the clamp can self-align the pin and thus the object. As such, the tools that might sometimes be used in previous approaches to align pins of an object with openings might not be needed when using the clamps disclosed herein. As used herein, direct contact includes physically touching with no intervening objects or spaces.

The direct contact between the clamping elements and the pin when the pin is clamped provides more accurate alignment of the pin and the object compared to previous approaches that may align an object by inserting a pin in an opening. For example, the opening may be larger than the pin to provide clearance to facilitate the insertion of the pin. The direct contact between the clamping elements and the pin in the present disclosure can avoid this. In some examples, precision machining may be used to achieve the proper clearance. The direct contact between the clamping elements and the pin in the present disclosure can avoid this.

In some examples, the biasing device can rotate the clamping elements away from the pin in response to the object being moved out of contact with the clamping elements. This can help reduce jamming between the pin and the clamping elements.

Figure 1A:
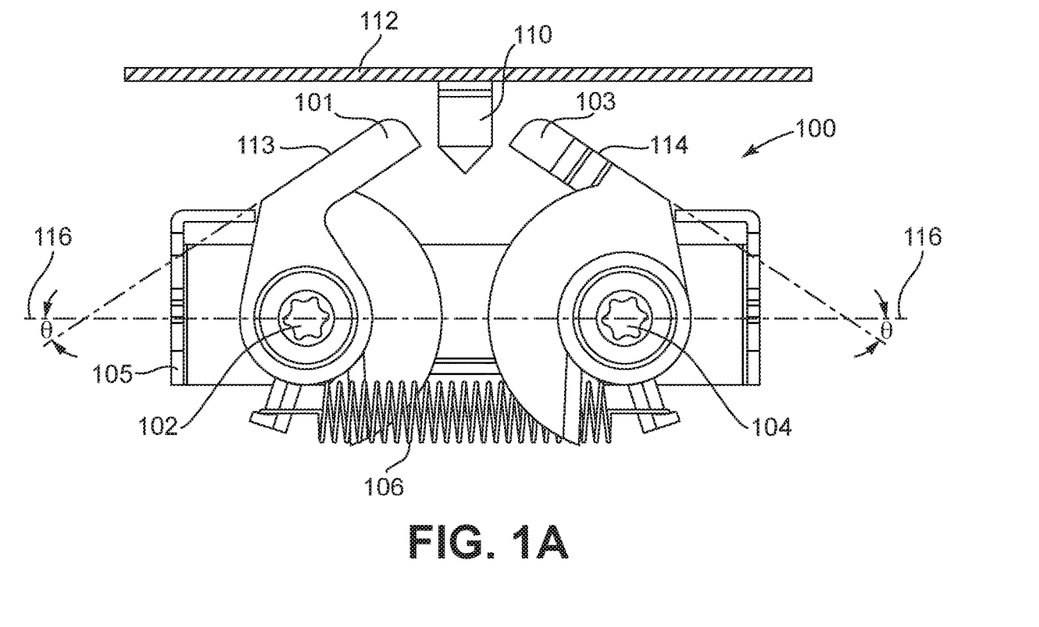
FIG. 1A illustrates a side view of an example clamp receiving a pin.
Figure 1B:
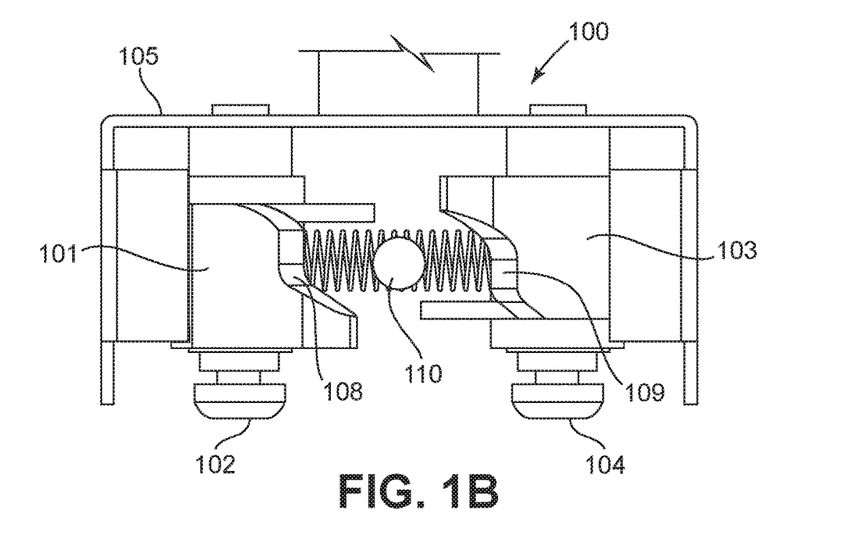
FIG. 1B illustrates a top view corresponding to the side view of FIG. 1A.

FIG. 1A illustrates a side view of an example clamp receiving a pin. FIG. 1B illustrates a top view corresponding to the side view of FIG. 1A. For example, FIGS. 1A and 1B respectively illustrate side and top views of an example clamp 100 in a fully open state. For example, the fully open state can be referred to as a non-clamping state. Clamp 100 includes a clamping element 101 (e.g., a jaw) rotatably coupled to a circular post 102 and a clamping element 103 (e.g., a jaw) rotatably coupled to a circular post 104 that is separated from post 102. Posts 102 and 104 can be secured (e.g., fastened) to a frame 105 of clamp 100 so that clamping elements 101 and 103 can respectively rotate about posts 102 and 104. Clamping elements 101 and 103 respectively include clamping surfaces 108 and 109. As used herein, clamping surfaces include surfaces that directly contact an object to restrain the object.

In some examples, "rotatably coupled" can be refer to a coupling that allows the rotation of an element relative to another element. For example, a rotatable coupling can constrain an element to rotate relative to (e.g., about) another element. In some examples, a rotatable coupling can refer to a contact coupling between the outer circular surface of a circular element, such as a post 102 or post 104, and the inner circular surface of a circular opening in another element, such as clamping element 101 or 103, that allows relative motion between the inner and outer surfaces.

A biasing device 106, such as a spring, (e.g., elastically) couples clamping element 101 to clamping element 103. Biasing device 106 maintains clamp 100 in its fully open state. For example, biasing device 106 maintains clamping element 101 and clamping element 103 in the non-clamping relationship shown in FIGS. 1A and 1B. In some examples, portions 113 and 114 respectively of clamping elements 101 and 103 can be at an angle $\theta$ with a single straight axis 116 (e.g., line) that passes through the centers of posts 102 and 104.

Figure 1C:
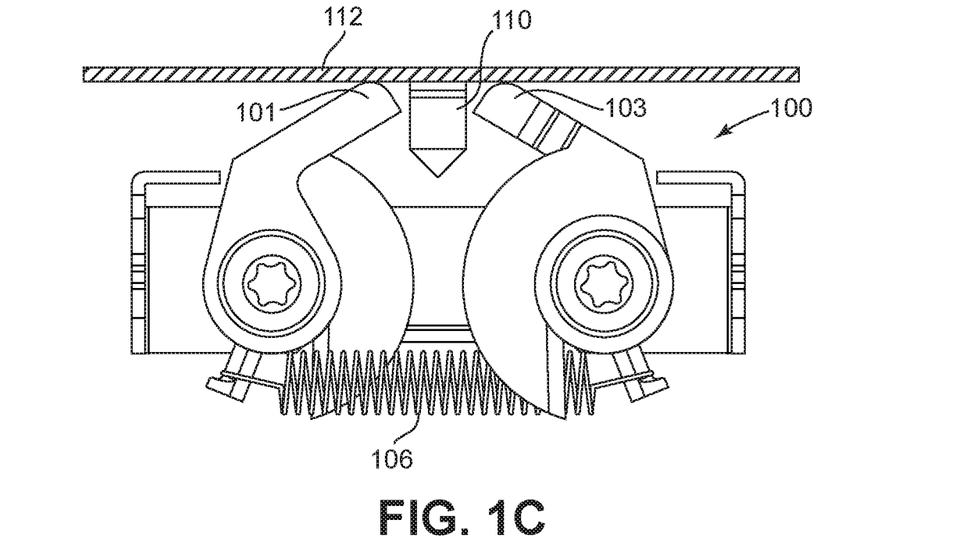
FIG. 1C illustrates a side view of clamping elements of an example clamp contacting an object with a pin to be clamped.
Figure 1D:
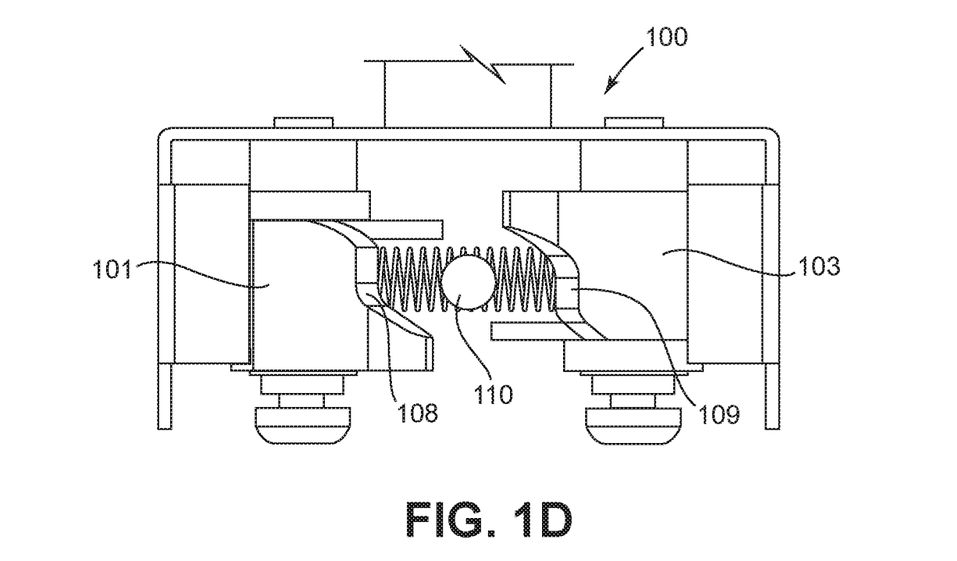
FIG. 1D illustrates a top view corresponding to the side view of FIG. 1C.
Figure 1E:
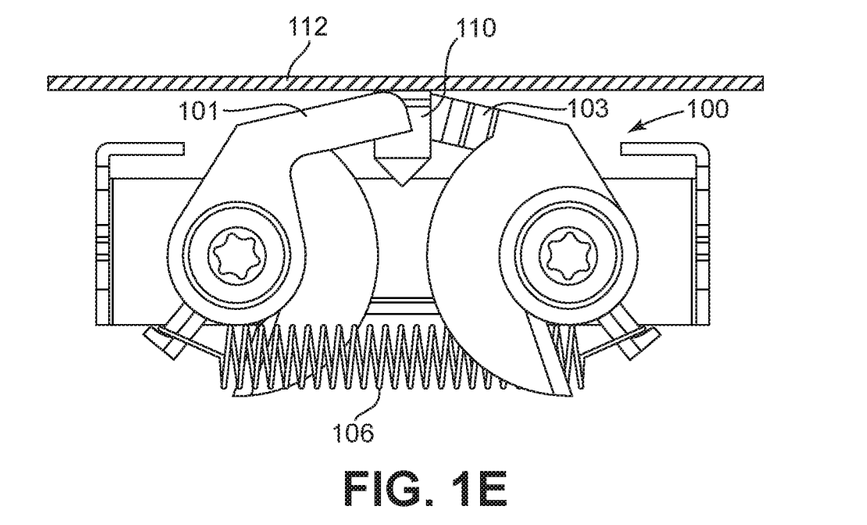
FIG. 1E illustrates a side view of clamping elements of an example clamp being rotated by an object with a pin to be clamped.
Figure 1F:
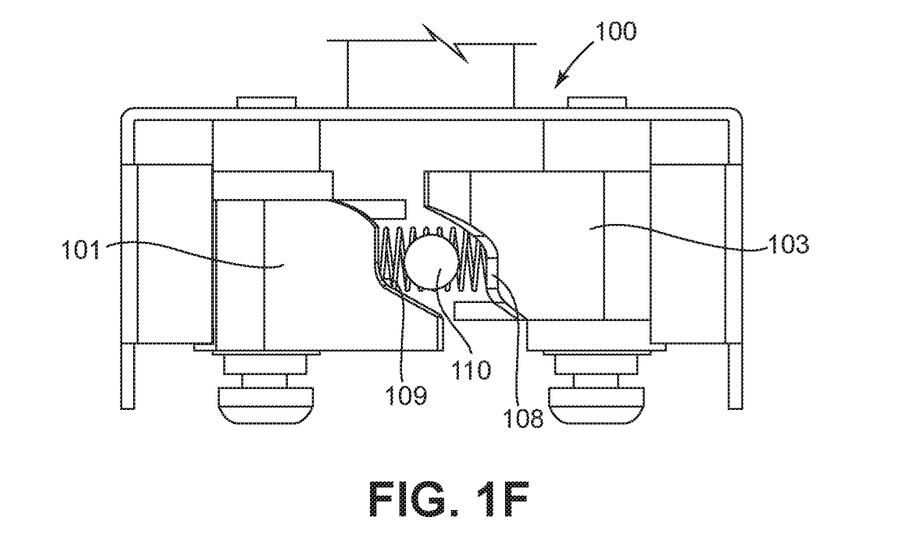
FIG. 1F illustrates a top view corresponding to the side view of FIG. 1E.
Figure 1G:
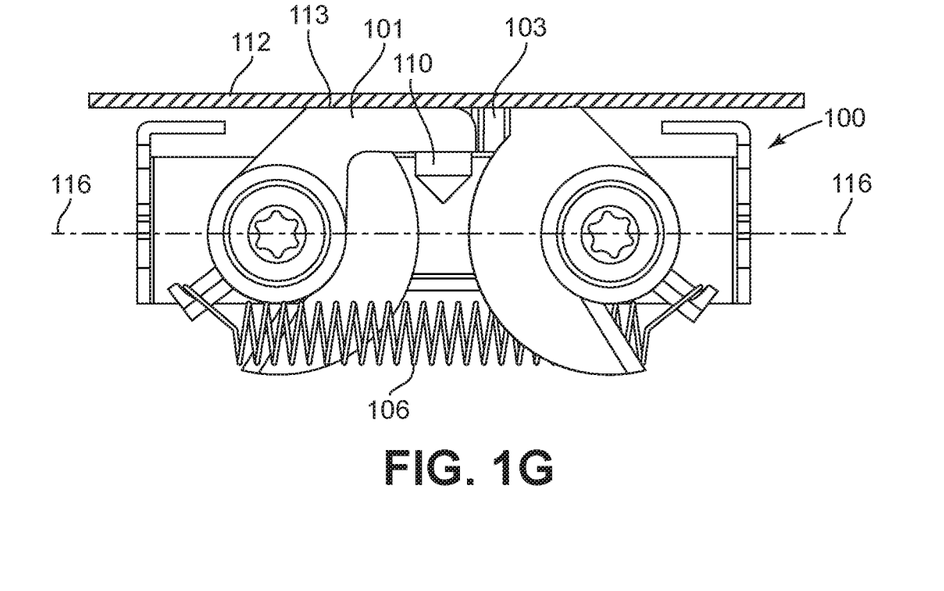
FIG. 1G illustrates a side view of an example clamp clamping a pin.
Figure 1H:
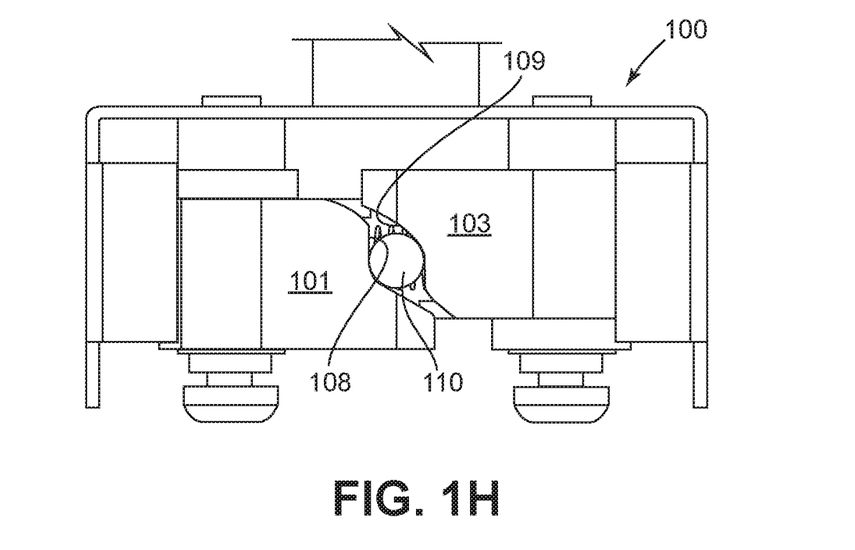
FIG. 1H illustrates a top view of the example clamp clamping the pin.

FIG. 1C illustrates a side view of clamping elements of an example clamp contacting an object with a pin to be clamped. FIG. 1D illustrates a top view corresponding to the side view of FIG. 1C. FIG. 1E illustrates a side view of clamping elements of an example clamp being rotated by an object with a pin to be clamped. FIG. 1F illustrates a top view corresponding to the side view of FIG. 1E. FIG. 1G illustrates a side view of an example clamp clamping a pin. FIG. 1H illustrates a top view of the example clamp clamping the pin. For example, FIGS. 1A, 1C, 1E, and 1G illustrate side views at respective instants of time during an example alignment method, and FIGS. 1B, 1D, 1F, and 1H illustrate top views at the respective instants of time during the example alignment method.

In FIGS. 1A and 1B, a pin 110 of an object, such as a component 112, is received between clamping element 101 and clamping element 103 in response to component 112 moving toward clamping element 101 and clamping element 103. In some examples, component 112 can be an access panel, an access door, an access drawer, or a replaceable unit of an imaging device. FIGS. 1C and 1D correspond to the instant of time at which component 112 first makes (e.g., direct) contact with clamping element 101 and clamping element 103. For example, component 112 is concurrently contacting clamping element 101 and clamping element 103 in FIG. 1C. Note that in FIGS. 1C and 1D clamp 100 is still in its fully open state.

As used herein, multiple acts occurring concurrently can mean that each of these acts occurs for a respective time period, and each of these respective time periods can overlap, in part or in whole, with each of the remaining respective time periods. In other words, those acts occur concurrently for some period of time.

The angle $\theta$ can be selected to reduce the likelihood of (e.g., prevent) jamming from occurring between component 112 and portions 113 and 114 respectively of clamping elements 101 and 103. For example, if the angle $\theta$ is too large, jamming can occur between component 112 and portions 113 and 114, and clamping elements 101 and 103 might not rotate in response to component 112 pushing against portions 113 and 114 as component 112 moves toward posts 102 and 104. The angle $\theta$ is also selected to provide a large initial opening between clamping elements 101 and 103, relative to the diameter of pin 110. Note that the opening is smaller for smaller values of $\theta$. In some examples, the angle of $\theta$ can be in a range of 30 degrees to 45 degrees. For example, angles in the range of 30 degrees to 45 degrees can reduce the likelihood of jamming from occurring as well as providing a large initial opening between clamping elements 101 and 103, relative to the diameter of pin 110.

FIGS. 1E and 1F correspond to the instant of time at which clamping element 101 and clamping element 103 have been concurrently rotated toward pin 110 in response to component 112 actuating clamping element 101 and clamping element 103 into rotation (e.g., concurrently). For example, clamping element 101 and clamping element 103 can rotate from their positions in FIGS. 1C and 1D to their positions in FIGS. 1E and 1F in response to component 112 exerting a force on (e.g., pushing against) clamping element 101 and clamping element 103. For example, clamping element 101 and clamping element 103 can rotate against the biasing force exerted clamping element 101 and clamping element 103 by biasing device 106.

FIGS. 1G and 1H correspond to the instant of time at which clamping element 101 and clamping element 103 (e.g., clamping surfaces 108 and 109) have been concurrently rotated into direct contact (e.g., engagement) with pin 110 in response to component 112 actuating clamping element 101 and clamping element 103 into rotation. For example, component 112 rotates clamping element 101 and clamping element 103 as component 112 pushes against clamping element 101 and clamping element 103. FIGS. 1G and 1H can correspond to a fully closed state of clamp 100. For example, the fully closed state can be referred to as a clamping state.

Note that the portion 113 of clamping element 101 is parallel or substantially parallel to the axis 116 in clamping state shown in FIG. 1G (e.g., the angle $\theta$ is zero or near zero). Although not visible in FIG. 1G the portion 114 of clamping element 103 is parallel to the axis 116 in the clamping state shown in FIG. 1G. As such, clamping elements 101 and 103 may be rotated by the angle $\theta$ between the non-clamping state in FIGS. 1A and 1C and the clamping state in FIG. 1G. In some examples, component 112 can be parallel to axis 116 in the clamping state, as shown in FIG. 1G. It should be recognized the term parallel takes into account variations from "exactly" parallel due to routine manufacturing and/or assembly variations. For example, substantially parallel can be more parallel than perpendicular.

In some examples, component 112 holds clamping element 101 and clamping element 103 in clamping contact with pin 110 in the clamping state by being in contact with clamping element 101 and clamping element 103, as shown in FIG. 1G. In some examples, biasing device 106 holds clamping element 101 and clamping element 103 against component 112 while component 112 holds clamping element 101 and clamping element 103 in clamping contact with pin 110. For example, biasing device causes clamping element 101 and clamping element 103 to exert a force on component 112.

In FIGS. 1A, 1C, and 1E, and FIGS. 1B, 1D, and 1F, component 112 is moving toward posts 102 and 104. For example, 1A, 1C, and 1E are ordered to illustrate this movement. Component 112 stops moving at FIGS. 1G and 1H when clamping element 101 and clamping element 103 contact pin 110. In FIGS. 1C and 1E and FIGS. 1D and 1F, component 112 rotates clamping element 101 and clamping element 103 as component 112 moves toward posts 102 and 104.

Note that in the fully open state of clamp 100 in FIGS. 1A to 1D, the opening between clamping elements 101 and 103 is relatively large compared to the diameter of pin 110 (e.g., due in part to the angle θ). For example, there is a relatively large amount of clearance between clamping elements 101 and 103 (e.g., clamping surfaces 108 and 109) and pin 110. This helps reduce the likelihood of (e.g., helps prevent) jamming from occurring between clamping elements 101 and 103 and pin 110 in the event pin 110 and component 112 become cocked. Moreover, the relatively large opening between clamping elements 101 and 103 provides a large region for receiving pin 110, which can be helpful when trying to align pin 110 with opening, such as when the opening is blocked from view. As used herein, cocked can include not straight or tilted.

As elements 101 and 103 are rotated, the opening becomes smaller as shown in FIG. 1F. However, in FIG. 1F, the opening is still rather large compared to diameter of pin 110 and there still is a relatively large amount of clearance between clamping elements 101 and 103 and pin 110, so as to help reduce the likelihood of jamming from occurring between clamping elements 101 and 103 and pin 110.

Removal of pin 110 from clamp 100 can be seen from viewing FIGS. 1A, 1C, 1E, and 1G and FIGS. 1B, 1D, 1F, and 1H in reverse order. When component 112 is moved away from its position in FIGS. 1G and 1H and away from posts 102 and 104, friction between clamping elements 101 and 103 and pin 110 and the biasing force exerted on clamping elements 101 and 103 causes clamping elements 101 and 103 to rotate. For example, the movement of component 112 actuates clamping elements 101 and 103 into rotation. As component 112 moves to its position in FIG. 1E, the biasing force on clamping elements 101 and 103 rotates clamping elements 101 and 103 away from pin 110 as component 112 moves away from posts 102 and 104. As clamping elements 101 and 103 rotate, the size of the opening between clamping elements 101 and 103 increases, thus increasing the amount of clearance between clamping elements 101 and 103. This helps reduce the likelihood of jamming from occurring between clamping elements 101 and 103 and pin 110.

As component 112 moves to its position in FIG. 1C from its position in FIG. 1E, biasing device 106 continues to exert a force on clamping elements 101 and 103 that further rotates clamping elements 101 and 103 away from pin 110 as component 112 continues to move away from posts 102 and 104. As clamping elements 101 and 103 continue to rotate, the size of the opening between clamping elements 101 and 103 continues increase, and the amount of clearance between clamping elements 101 and 103 continues to increase. This further helps reduce the likelihood of jamming from occurring between clamping elements 101 and 103 and pin 110.

In FIGS. 1C and 1D, clamp 100 is fully open and clamping elements 101 and 103 are done rotating. As component 112 moves to its position in FIG. 1A from its position in FIG. 1C, pin 110 is extracted from between clamping elements 101 and 103.

Figure 2:
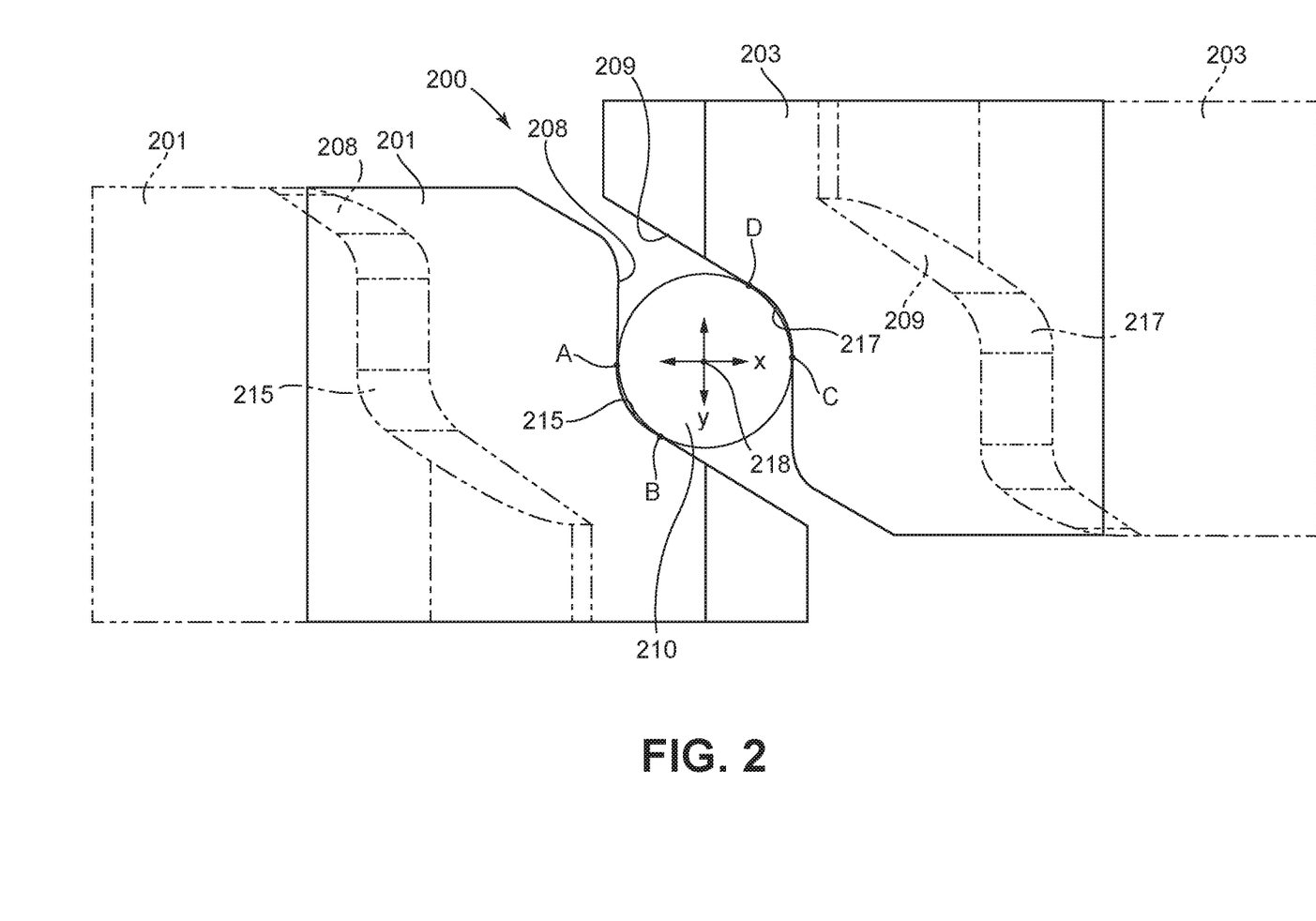
FIG. 2 illustrates an example of a clamp.

FIG. 2 illustrates an example of a clamp 200. Clamp 200 can be similar to (e.g., the same as) clamp 100. Clamp 200 has clamping elements 201 and 203 that can be similar (e.g., the same as) clamping elements 101 and 103 and that can be coupled to each other by a biasing device, such as biasing device 106. In FIG. 2, clamping elements 201 and 203 are shown clamping a pin 210 and in a non-clamping relationship in the phantom view (shown by the lines with the long and short dashes). For example, the phantom view may correspond to clamp 200 being in its fully open state. Note, the relatively large opening, compared to the diameter of pin 210, between clamping elements 201 and 203 and the relatively large clearance between clamping elements 201 and 203 and pin 210 when clamp 200 is in its fully open state. This helps reduce the likelihood of (e.g., helps prevent) jamming from occurring between clamping elements 201 and 203 and pin 210 in the event pin 210 becomes cocked. Moreover, the relatively large opening between clamping elements 201 and 203 provides a large region for receiving pin 210, which can be helpful when trying to align pin 210 with the opening, such as when the opening is blocked from view.

In the example of FIG. 2, clamping elements 201 and 203 restrain the pin 210 from moving in the x-direction and the y-direction. As such, clamping elements 201 and 203 restrain the pin 210 from moving along two axes (e.g., the x-axis and the y-axis).

Clamping surface 208 has a curved portion 215 that curves around a portion of the circumference of pin 210 and contacts the curved surface of pin 210 at points A and B along the circumference of pin 210. Clamping surface 209 has a curved portion 217 that curves around another portion of the circumference of pin 210 and contacts the curved surface of pin 210 at points C and D along the circumference of pin 210. In some examples, each time clamping elements 201 and 203 clamp pin 210, they clamp pin 210 such that the center 218 of pin 210 is at the same x-y location between clamping elements 201 and 203 (e.g., to within the tolerances of clamp 200).

Figure 3:
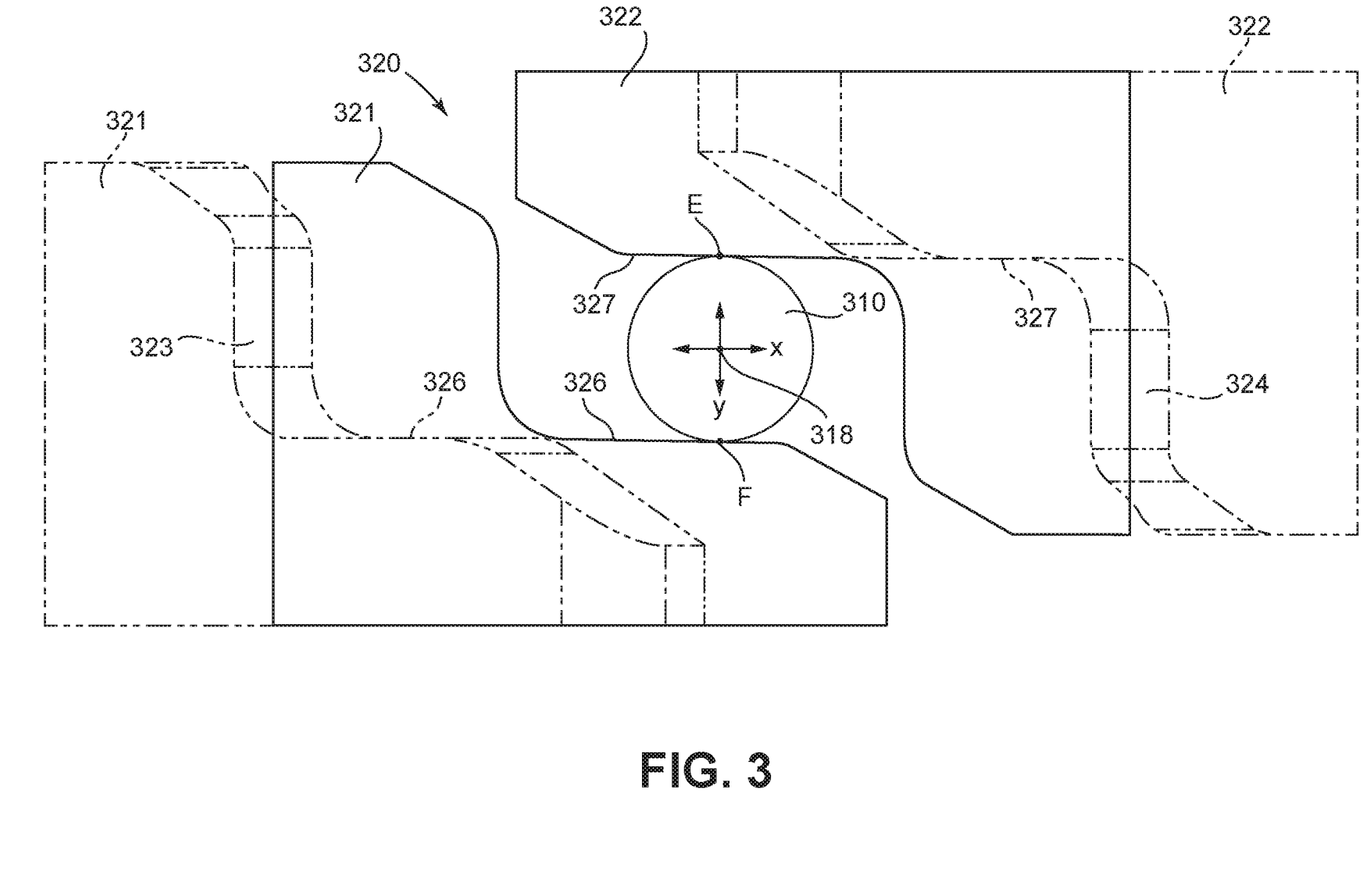
FIG. 3 illustrates another example of a clamp.

FIG. 3 illustrates another example of a clamp. For example, FIG. 3 illustrates an example of a clamp 320 having clamping elements 321 and 322 that can respectively replace clamping elements 101 and 103 of clamp 100 and that can be elastically coupled to each other by a biasing device, such as biasing device 106. For example, clamping elements 321 and 322 can be respectively rotatably coupled to posts 102 and 104. In FIG. 3, clamping elements 321 and 322 are shown clamping a pin 310 and in a non-clamping relationship in the phantom view (shown by the lines with the long and short dashes). For example, the phantom view may correspond to clamp 320 being in its fully open state.

Note, the relatively large opening, compared to the diameter of pin 310, between clamping elements 321 and 322 and the relatively large clearance between clamping elements 321 and 322 and pin 310 when clamp 320 is in its fully open state. This helps reduce the likelihood of (e.g., helps prevent) jamming from occurring between clamping elements 321 and 322 and pin 310 in the event pin 310 and component 112 become cocked. Moreover, the relatively large opening between clamping elements 321 and 322 provides a large region for receiving pin 310, which can be helpful when trying to align pin 310 with the opening, such as when the opening is blocked from view.

In the example of FIG. 3, clamping elements 321 and 322 restrain the pin 310 from moving in the y-direction. For example, clamping elements 321 and 322 can restrain pin 310 from moving along a single axis (e.g., the y-axis). In some examples, each time clamping elements 321 and 322 clamp pin 310, they clamp pin 310 such that the center 318 of pin 310 is at the same y location between clamping elements 321 and 322 (e.g., to within the tolerances of clamp 320). However, in some examples, the x location of the center 318 between clamping elements 321 and 322 can vary between clampings.

Clamping surface 323 has a straight portion 326 that contacts the curved surface of pin 310 at a point F (e.g., on the circumference of pin 310). Clamping surface 324 has a straight portion 327 that contacts the curved surface of pin 310 at a point E (e.g., on the circumference of pin 310). For example, points E and F can be diametrically opposed (e.g., 180 degrees apart around the circumference of pin 310).

Figure 4A:
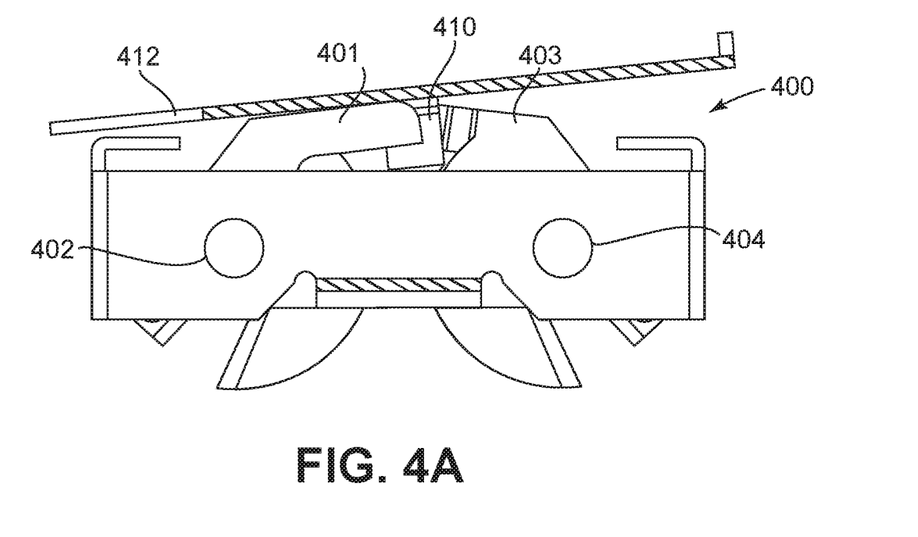
FIG. 4A illustrates a side view of an example clamp during an example alignment process.
Figure 4B:
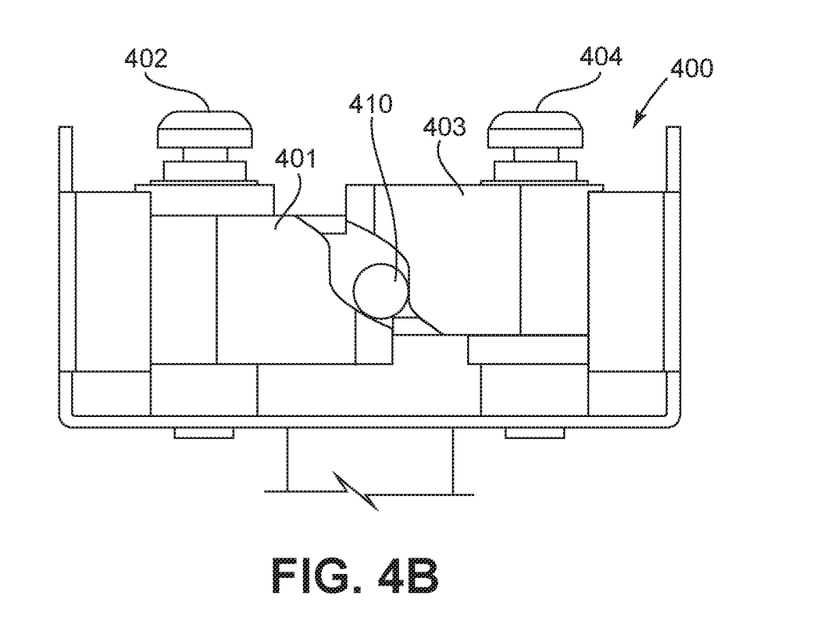
FIG. 4B illustrates a top view corresponding to the side view of FIG. 4A.
Figure 4C:
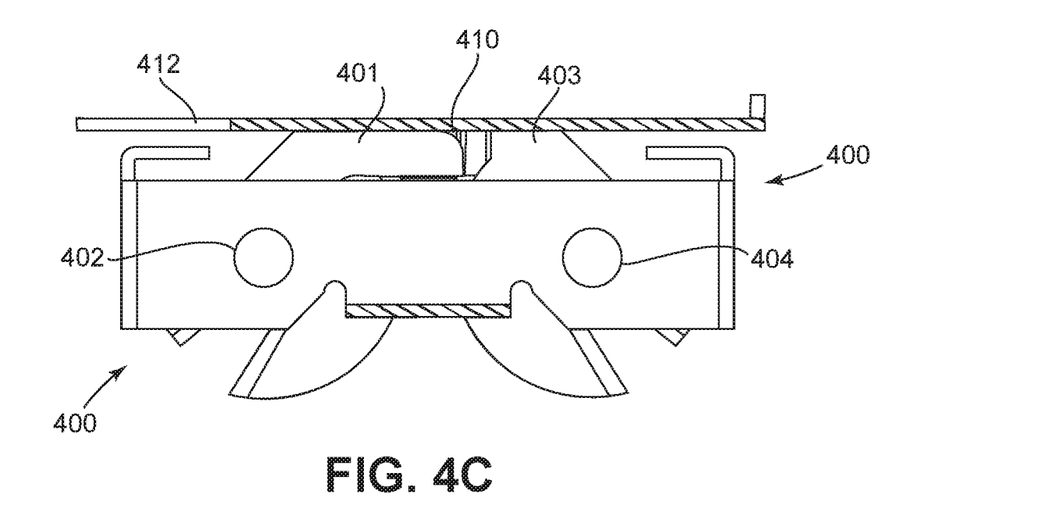
FIG. 4C illustrates a side view of an example clamp clamping a pin.
Figure 4D:
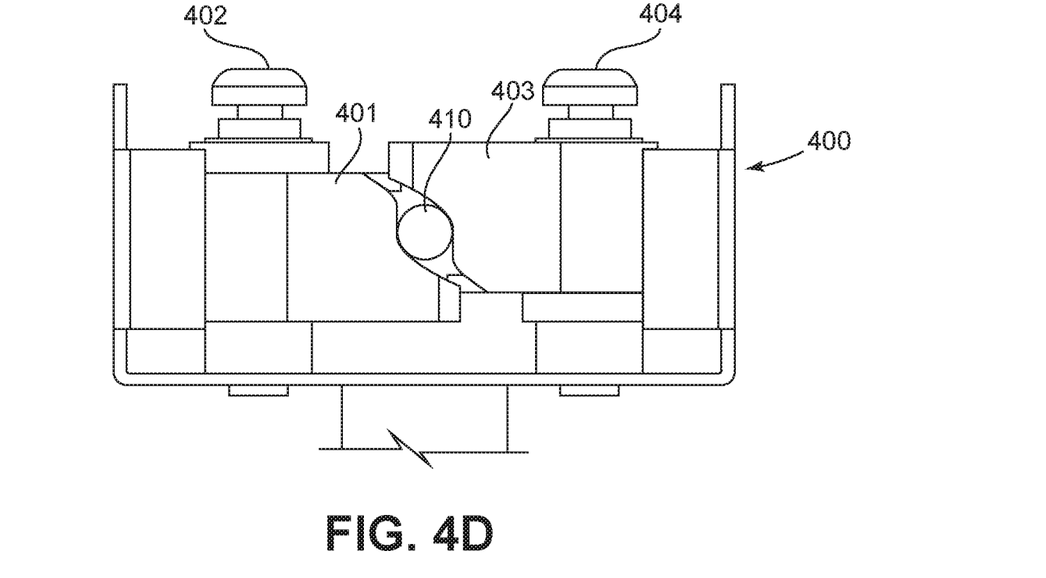
FIG. 4D illustrates a top view of the example clamp clamping the pin.

FIG. 4A illustrates a side view of an example clamp during an example alignment process. FIG. 4B illustrates a top view corresponding to the side view of FIG. 4A. FIG. 4C illustrates a side view of an example clamp clamping a pin. FIG. 4D illustrates a top view of the example clamp clamping the pin. For example, FIGS. 4A and 4C illustrate side views at respective instants of time during an example alignment method, and FIGS. 4B and 4D illustrate top views at the respective instants of time during the example alignment method. In FIGS. 4A to 4D, a clamp 400 that can be similar to (e.g., the same as) clamp 100 includes clamping elements 401 and 403 that can be respectively similar to (e.g., the same as) clamping elements 101 and 103. Clamping elements 401 and 403 are respectively rotatably coupled to posts 402 and 404. Although not shown in FIGS. 4A to 4D, a biasing device, such as biasing device 106, can couple clamping elements 401 and 403 to each other, such as described previously in conjunction with FIGS. 1A and 1B.

In FIGS. 4A and 4B, a component 412 that can be similar to (e.g., the same as) component 112, is cocked and is pressing against clamping elements 401 and 403. A pin 410 of component 412 that is between and in contact with clamping elements 401 and 403 is also cocked.

As component 412 moves to its position in FIG. 4C, component 412 pushes against clamping elements 401 and 403, causing them to rotate to their respective positions in FIGS. 4C and 4D. As clamping elements 401 and 403 rotate, they move pin 410 from the position in FIGS. 4A and 4B to the position in FIGS. 4C and 4D. As pin 410 moves from the position in FIGS. 4A and 4B to the position in FIGS. 4C and 4D, component 412 moves from the position in FIGS. 4A and 4B to the position in FIGS. 4C and 4D. In FIGS. 4C and 4D, pin 410 is aligned and clamped between clamping elements 401 and 403. For example, clamping elements 401 and 403 are in direct contact with pin 410.

Figure 5:
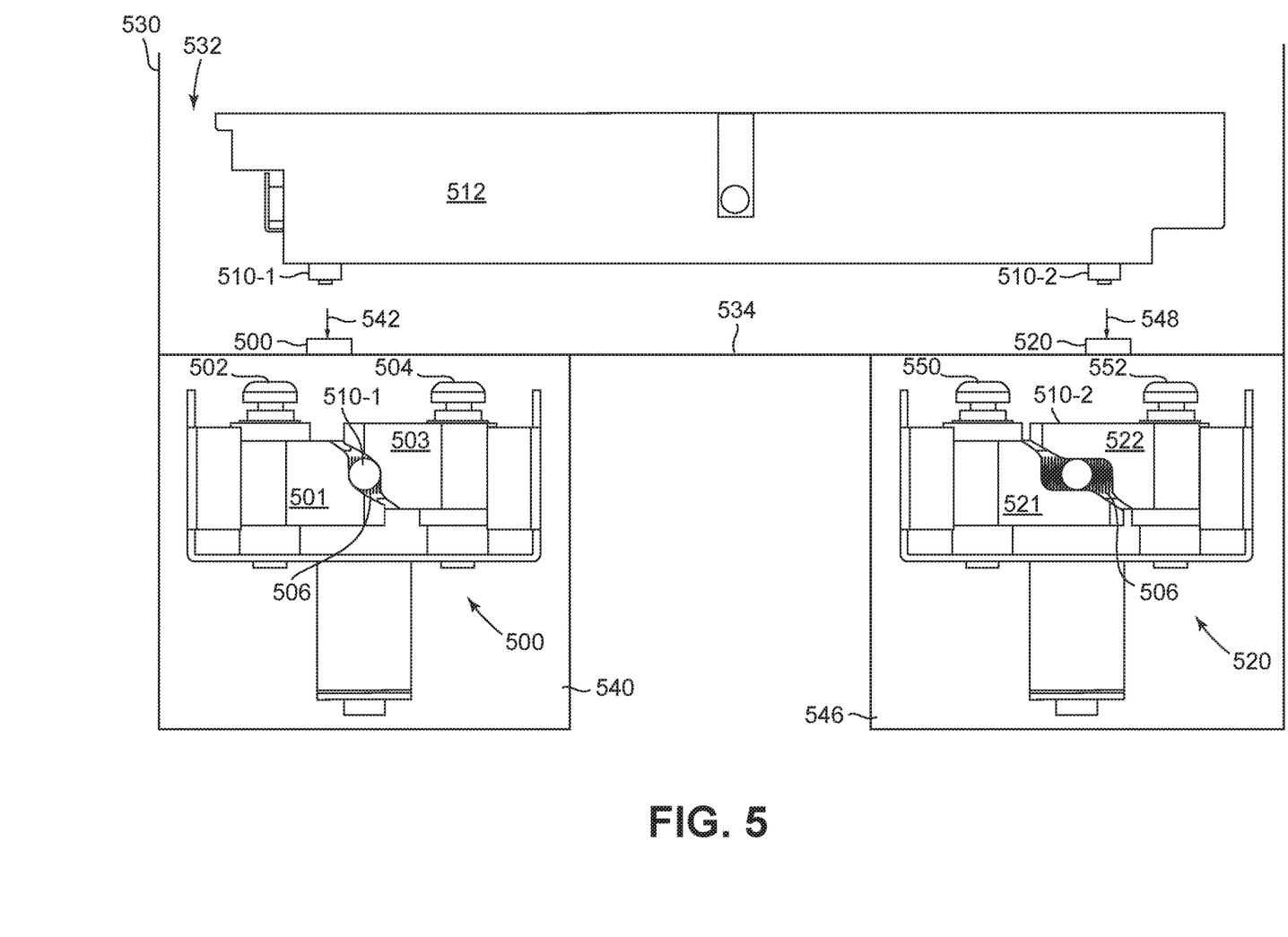
FIG. 5 illustrates an example apparatus consistent with the disclosure.

FIG. 5 illustrates an example apparatus consistent with the disclosure. For example, FIG. 5 illustrates a portion of an example apparatus 530 that can be an imaging system. In FIG. 5, a component 512 (e.g., of apparatus 530), such as a field replaceable unit, is being inserted into a compartment 532 of apparatus 530. Alternatively, component 512 may be in the process of being removed from compartment 532. Component 512 includes pins 510-1 and 510-2 to align component 512 within compartment 532.

Apparatus 530 includes clamps 500 and 520 that can be mounted on a wall 534, such as at the end (e.g., the bottom) of compartment 532. Clamp 500 can be similar to (e.g., the same as) clamp 100 or clamp 200, and clamp 520 can be similar to (e.g., the same as) clamp 320. The view 540 of clamp 500 is a top view of clamp 500 viewed in the direction of arrow 542 and shows clamp 500 clamping pin 510-1. The view 546 is a top view of clamp 520 viewed in the direction of arrow 548 and shows clamp 520 clamping pin 510-2. In some examples, component 512 can prevent a person who is either inserting or removing component 512 from compartment 532 from seeing pins 510-1 and 510-2 and clamps 500 and 520.

Clamp 500 includes clamping elements 501 and 503 that can be respectively similar to (e.g., the same as) clamping elements 101 and 103 or clamping elements 201 and 203. For example, clamping elements 501 and 503 can restrain pin 510-1 along two axes, as described previously in conjunction with FIG. 2. Clamping elements 501 and 503 are respectively rotatably coupled to posts 502 and 504. Although not shown in FIG. 5, a biasing device, such as biasing device 106, can elastically couple clamping elements 501 and 503 to each other, such as described previously in conjunction with FIGS. 1A and 1B. The biasing device can bias clamp 500 in its fully open position with clamping elements 501 and 503 in a non-clamping relationship, such as in FIG. 1A and in the phantom view in FIG. 2. As shown in FIGS. 1A and 2, the opening between the clamping elements is large relative to the diameter of the pin. The relatively large opening provides a large region for receiving the pin, such as pin 510-1, which can be helpful when trying to align pin 510-1 with the opening, such as when the opening is blocked from view by component 512.

Clamp 520 includes clamping elements 521 and 522 that can be respectively similar to (e.g., the same as) clamping elements 321 and 322. For example, clamping elements 521 and 522 can restrain pin 510-2 along a single axis, as described previously in conjunction with FIG. 3. Clamping elements 521 and 522 are respectively rotatably coupled to posts 550 and 552. A biasing device 506 can elastically couple clamping elements 521 and 522 to each other, such as described previously in conjunction with FIGS. 1A and 1B. Biasing device 506 can bias clamp 520 in its fully open position with clamping elements 521 and 522 in a non-clamping relationship, such as in the phantom view in FIG. 3. As shown in FIG. 3, the opening between the clamping elements is large relative to the diameter of the pin. The relatively large opening provides a large region for receiving the pin, such as pin 510-2, which can be helpful when trying to align pin 510-2 with the opening, such as when the opening is blocked from view by component 512.

As component 512 is inserted into compartment 532, pin 510-1 is received between clamping elements 501 and 503, and pin 510-2 is received between clamping elements 521 and 522. When component 512 contacts clamping elements 501 and 503 and clamping elements 521 and 522, component 512 pushes against clamping elements 501 and 503 and clamping elements 521 and 522 as component 512 moves toward wall 534, causing clamping elements 501 and 503 to rotate into direct engagement with pin 510-1 and clamping elements 521 and 522 to rotate into direct engagement with pin 510-2.

Figure 6:
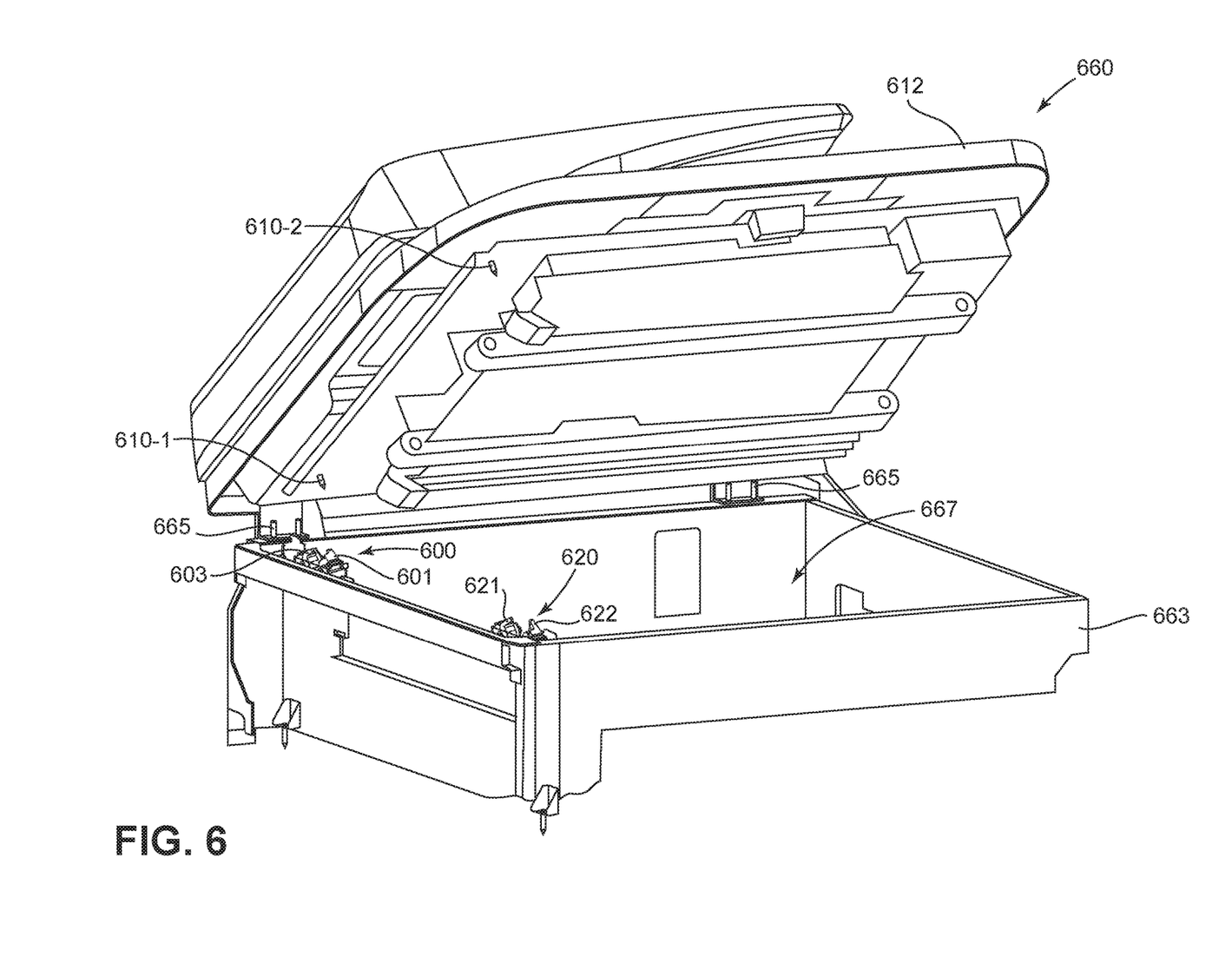
FIG. 6 illustrates an example apparatus consistent with the disclosure.

FIG. 6 illustrates an example apparatus consistent with the disclosure. For example, FIG. 6 illustrates a portion of an example apparatus 660 that can be an imaging system. Apparatus 660 includes a component, such as an access door 612 that is pivotally coupled to a chassis 663 of apparatus 660 by hinges 665. Access door 612 provides access to a compartment 667 within chassis 663. Access door 612 includes pins 610-1 and 610-2 to align access door 612 over compartment 667.

Apparatus 660 includes clamps 600 and 620 that can be mounted on chassis 663. Clamp 600 is to align and clamp pin 610-1, and clamp 620 is to align and clamp pin 610-2.

Clamp 600 can be similar to (e.g., the same as) clamp 100, clamp 200, or clamp 500, and clamp 620 can be similar to (e.g., the same as) clamp 320 or clamp 520. For example, clamp 600 can include clamping elements 601 and 603 that can be respectively similar to (e.g., the same as) clamping elements 101 and 103, clamping elements 201 and 203, or clamping elements 501 and 503 and that can be coupled together by a biasing device, such as biasing device 106. For example, clamping elements 601 and 603 can restrain pin 610-1 along two axes, as discussed previously in conjunction with FIG. 2. Clamping elements 601 and 603 can be respectively rotatably coupled to posts that can be similar to (e.g., the same as) posts 102 and 104 or posts 502 and 504. Clamping elements 601 and 603 can be maintained in a non-clamping relationship, as shown in FIG. 6, by the biasing device when access door 612 is open.

Clamp 620 can include, for example, clamping elements 621 and 622 that can be respectively similar to (e.g., the same as) clamping elements 321 and 322 or clamping elements 521 and 522 and that can be coupled together by a biasing device, such as biasing device 506. For example, clamping elements 621 and 622 can restrain pin 610-2 along a single axis, as discussed previously in conjunction with FIG. 3. Clamping elements 621 and 622 can be respectively rotatably coupled to posts that can be similar to (e.g., the same as) posts 550 and 552. Clamping elements 621 and 622 can be maintained in a non-clamping relationship, as shown in FIG. 6, by the biasing device when access door 612 is open.

As access door 612 is pivoted to close (e.g., cover) compartment 667, pin 610-1 is received between clamping elements 601 and 603, and pin 610-2 is received between clamping elements 621 and 622. When access door 612 contacts clamping elements 601 and 603 and clamping elements 621 and 622, access door 612 pushes against clamping elements 601 and 603 and clamping elements 621 and 622 as access door 612 pivots, causing clamping elements 601 and 603 to rotate into direct contact with pin 610-1 and clamping elements 621 and 622 to rotate into direct contact with pin 610-2. Note that the access door 612 can reach clamping elements 601 and 603 and push against clamping elements 601 and 603 before access door 612 reaches clamping elements 621 and 622.

Figure 7:
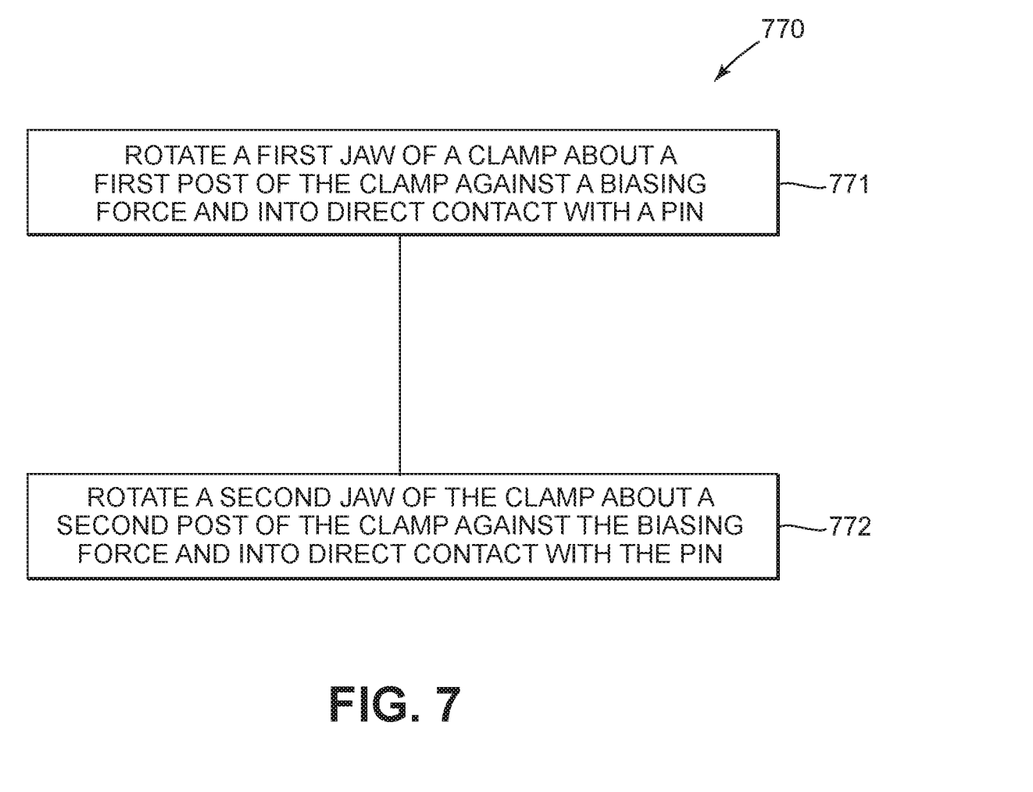
FIG. 7 illustrates a flowchart of an example method consistent with the disclosure.

FIG. 7 illustrates a flowchart of an example method consistent with the disclosure. For example, FIG. 7 is a flowchart of an example alignment method 770. At block 771, a first jaw of a clamp is rotated about a first post of the clamp against a biasing force and into direct contact with a pin. At block 772, a second jaw of the clamp is rotated about a second post of the clamp against the biasing force and into direct contact with the pin. In some examples, the first and second jaws rotate concurrently.

The figures herein follow a numbering convention in which the first digit corresponds to the drawing figure number and the remaining digits identify an element or component in the drawing. Elements shown in the various figures herein may be capable of being added, exchanged, and/or eliminated so as to provide a number of additional examples of the detailed description. In addition, the proportion and the relative scale of the elements provided in the figures are intended to illustrate the examples of the detailed description and should not be taken in a limiting sense.

It should be understood that the descriptions of various examples may not be drawn to scale and thus, the descriptions may have a different size and/or configuration other than as shown therein.

What is claimed is:

1. An apparatus, comprising:
 a pin; and
 a clamp, comprising:
  a first post;
  a first clamping element rotatably coupled to the first post;
  a second post separate from the first post;
  a second clamping element rotatably coupled to the second post; and
  a biasing device that couples the first clamping element to the second clamping element;
 wherein the first clamping element moves the pin as the first clamping element and the second clamping element are rotating.

2. The apparatus of claim 1, wherein the biasing device is to maintain the first clamping element and the second clamping element in a non-clamping relationship.

3. The apparatus of claim 1, wherein the first clamping element and the second clamping element are to be concurrently rotated into direct contact with the pin.

4. The apparatus of claim 1, wherein the first clamping element and the second clamping element rotate into direct contact with the pin in response to an object comprising the pin actuating the first clamping element and the second clamping element.

5. The apparatus of claim 1, wherein the first clamping element comprises a curved portion arranged to receive the pin at two points while the clamp is clamping the pin and the second clamping element comprises a curved portion arranged to receive the pin at two additional points while the clamp is clamping the pin.

6. The apparatus of claim 1, wherein the first clamping element comprises a straight portion arranged to receive the pin at a single point while the clamp is clamping the pin and the second clamping element comprises a straight portion arranged to receive the pin at an additional single point while the clamp is clamping the pin.

7. The apparatus of claim 1, wherein the first clamping element comprises a portion that makes an angle in a range of 30 degrees to 45 degrees with an axis that passes through the centers of the first and second posts and the second clamping element comprises a portion that makes an angle in the range of 30 degrees to 45 degrees with the axis.

8. An apparatus, comprising:
 an object;
 a pin coupled to the object; and
 a clamp, comprising:
  a first rotatable jaw; and
  a second rotatable jaw;
  wherein:
   the first rotatable jaw includes a first interface portion to receive the pin of the object responsive to the object actuating the first rotatable jaw;
   the second rotatable jaw includes a second interface portion to receive the pin of the object responsive to the object actuating the second rotatable jaw; and
   the first rotatable jaw moves the pin as the first rotatable jaw and the second rotatable jaw are rotating.

9. The apparatus of claim 8, wherein the first rotatable jaw and the second rotatable jaw are arranged to release the respective pin responsive to the object moving out of contact with the first rotatable jaw and the second rotatable jaw.

10. The apparatus of claim 8, wherein the clamp is a first clamp and the pin is a first pin, the apparatus further comprising:
 a second clamp, comprising:
  a third rotatable jaw; and
  a fourth rotatable jaw;
  wherein the first rotatable jaw and the second rotatable jaw are arranged to restrain the first pin along two axes and the third rotatable jaw and the fourth rotatable jaw are arranged to restrain a second pin on the object along a single axis.

11. An alignment method, comprising:
rotating a first jaw of a clamp about a first post of the clamp against a biasing force and into direct contact with a pin;
rotating a second jaw of the clamp about a second post of the clamp against the biasing force and into direct contact with the pin; and
moving the pin with the first jaw as the first jaw and the second jaw are rotating.

12. The method of claim 11, further comprising rotating a third jaw and fourth jaw of an additional clamp into direct contact with an additional pin.

13. The method of claim 11, wherein the first jaw and second jaw rotate concurrently.

14. The method of claim 11, further comprising rotating the first jaw and the second jaw away from the pin in response to the biasing force.

15. The method of claim 11, wherein the first jaw and the second jaw rotate to a fully closed state, the first jaw and the second jaw being substantially parallel with an axis that passes through the centers of the first post and the second post.

* * * * *